United States Patent [19]

Traa et al.

[11] Patent Number: 5,420,645
[45] Date of Patent: May 30, 1995

[54] DISPLAY DEVICE USING SCAN VELOCITY MODULATION

[75] Inventors: Willebrordus G. Traa, Eindhoven; Jan H. Jonker, Hardenberg, both of Netherlands

[73] Assignee: U.S. Philips Corporation, New York, N.Y.

[21] Appl. No.: 153,382

[22] Filed: Nov. 16, 1993

[30] Foreign Application Priority Data

Nov. 17, 1992 [EP] European Pat. Off. ............ 92203524

[51] Int. Cl.[6] .......................... H04N 3/22; H04N 5/59
[52] U.S. Cl. ................................... 348/626; 348/806; 348/252; 315/371
[58] Field of Search ............... 348/626, 625, 252, 807, 348/806; 315/370, 371, 368.11–368.22, 399; H04N 3/32, 5/59

[56] References Cited

U.S. PATENT DOCUMENTS

| | | | |
|---|---|---|---|
| 4,170,785 | 10/1979 | Yoshida et al. | 348/626 |
| 4,183,064 | 1/1980 | Sahara et al. | 358/242 |
| 4,261,014 | 4/1981 | Sahara et al. | 348/626 |
| 4,322,742 | 3/1982 | Yoshida et al. | 348/626 |
| 4,665,432 | 5/1987 | Shima | 358/166 |
| 5,179,320 | 1/1993 | Tripod | 315/399 |

FOREIGN PATENT DOCUMENTS 0454082 10/1991 European Pat. Off. ........ H04N 1/40

*Primary Examiner*—James J. Groody
*Assistant Examiner*—Glenton B. Burgess
*Attorney, Agent, or Firm*—Edward W. Goodman

[57] ABSTRACT

To improve pictures to be displayed on a display screen of a display device, it is known to use scan velocity modulation. In scan velocity modulation the (horizontal) deflection rate of the electron beam(s) is modulated with the luminance component of the video signal. As a result of scan velocity modulation, the information of the video signal will no longer be displayed at the correct position on the display screen. By using the modulation signal applied to the scan velocity modulator also for modulating the (read) clock rate of the video signal from the memory, it can be ensured that the video signal and the (modulated) deflection signal are always in synchronism with each other.

8 Claims, 3 Drawing Sheets

DISPLAY DEVICE USING SCAN VELOCITY MODULATION

BACKGROUND OF THE INVENTION

1. Field of the Invention

The invention relates to a display device for displaying a video signal on a display screen of a display tube comprising at least one control electrode and deflection coils for deflecting at least one electron beam current, said display device further having an input for receiving the video signal, means for determining a derivative of a luminance component of the video signal, a scan velocity modulator for modulating the deflection rate of the electron beam current in the display tube in dependence upon the determined derivative, a position error correction circuit for correcting the video signal in dependence upon the derivative of the luminance component of the video signal, and means for applying the corrected video signal to the control electrode of the display tube.

2. Description of the Related Art

A display device of this type is known from U.S. Pat. No. 4,183,064. In this known display device, the position error is corrected by enlarging the portion of a display line having a higher luminance with respect to a portion having a smaller luminance and by subsequently applying scan velocity modulation (so as to obtain an improved definition) at which the dark/light transition is delayed and the light/dark transition is brought forward. As a result, the picture to be displayed is displayed with the original picture contents (the same quantity of light and dark portions as in the original video signal). In this solution, a second error (enlarging the light portions) is deliberately introduced to correct the first error (reducing the light portions as a result of scan velocity modulation). This is not an ideal solution because the two errors must compensate each other in this case. Correcting a non-linear error by means of a linear system is not very well possible. The drawback is that the position error cannot be satisfactorily corrected in this way. At a less sharp transition from light to dark (or conversely), the second error will be too large so that it will overcompensate the first error, whereas with a very sharp transition, the second error is too small so that the first error is not fully compensated. A further drawback is that it is not easy to enlarge the portions of the video signal having a higher luminance/brightness. Moreover, by enlarging the light portion, the beam current is increased so that the definition is adversely influenced due to spot growth.

To give pictures a better (impression of) sharpness, manufacturers focus on improvements of the display tube, inter alia by providing an improved phosphor layer and by improving the electron gun/guns. Moreover, scan velocity modulation of the electron beam deflection is used in a display tube (as is described, for example in the above-mentioned U.S. Patent). In this method the scan velocity (deflection rate) is adapted to the picture contents, notably to brightness variations. In scan velocity modulation, the derivative of the luminance component of the video signal is determined. Generally, the second derivative of the luminance component is used, which second derivative is applied to a voltage amplifier, an output of which applies a voltage to, for example, a scan velocity modulation coil. If a voltage-controlled current source is used instead of the voltage amplifier, the first derivative of the luminance component is taken. Actually, the scan velocity modulation coil is then the second differentiator. The scan velocity modulation is proportional to the second derivative of the voltage across the coil. By using scan velocity modulation, a position error is produced on the display screen (the video information rate is no longer synchronous with the scan velocity) at which a dark/light transition of the video signal is shifted to the right and a light/dark transition of the video signal is shifted to the left on the display screen. Consequently, portions of the video signal having a higher brightness/luminance are reduced with respect to portions of the video signal having a smaller light intensity. For example, when a plurality of successive squares (for example, a chessboard) is displayed, this effect can be clearly observed: larger (darker) and smaller (lighter) squares instead of squares all having the same size.

SUMMARY OF THE INVENTION

It is, inter alia an object of the invention to eliminate the above-mentioned drawbacks. To this end, the display device according to the invention is characterized in that the position error correction circuit comprises a frequency-modulatable clock which is coupled to the means for determining the derivative of the luminance component of the video signal for frequency-modulating the read clock rate of the video signal stored in a memory.

By modulating (varying) the clock rate at which the video information is written or read, the position error caused by scan velocity modulation can be corrected. The video signal is applied to the display tube at the same information rate as the scan velocity. Here, a (position) error which would arise due to scan velocity modulation is thus corrected instead of making two errors which hopefully counteract each other and are equally large as described in said U.S. patent.

Literature describes all kinds of examples in which higher derivatives or combinations of different derivatives for correcting the position error are used instead of the first and second derivatives of the video signal for use in scan velocity modulation. However, this results in a full correction of the position error at most for given slopes of transitions from light to dark and vice versa, whereas the picture will only degrade in the case of other slopes. Moreover, this renders the scan velocity modulation circuit much more complicated and hence more expensive. The display device according to the invention provides a solution which is completely different. This solution is that it is not attempted to correct the position error by means of the scan velocity modulation method (or by introducing a second error) but by modulating the clock with which the video information and the deflection is maintained synchronous at all times, thus principally precluding a position error.

The clock modulator is controlled by the same signal or by a corresponding signal with which the scan velocity modulator is controlled.

An embodiment of a display device according to the invention is characterized in that the display device further comprises a beam current modulator for modulating the electron beam current in dependence upon the determined derivative of the video signal. By using beam current modulation, brightness modulations occurring as undershoots and overshoots which may be produced by scan velocity modulation can be prevented or in any case reduced. This provides the possibility of using scan velocity modulation at a larger amplitude without this being a hindrance to the user of the display device, while a better picture sharpness is obtained. A larger amplitude of the scan velocity modulation results in a larger position error, which position error can be simply corrected again by means of the clock modulation.

A further embodiment of a display device according to the invention is characterized in that the display device also comprises an aperture correction circuit for correcting the luminance component of the video signal. By combining the scan velocity modulation with an aperture correction, a picture which is even sharper is obtained. At small or less steep jumps in the beam currents, the scan velocity modulation does not yield considerable improvements of the picture sharpness, whereas the opposite is true for aperture correction. By combining scan velocity modulation with an aperture correction, the sharpness of the picture can also be improved at these beam currents.

These and other aspects of the invention will be apparent from and elucidated with reference to the embodiments described hereinafter.

DESCRIPTION OF THE PREFERRED EMBODIMENTS

Figure 1:
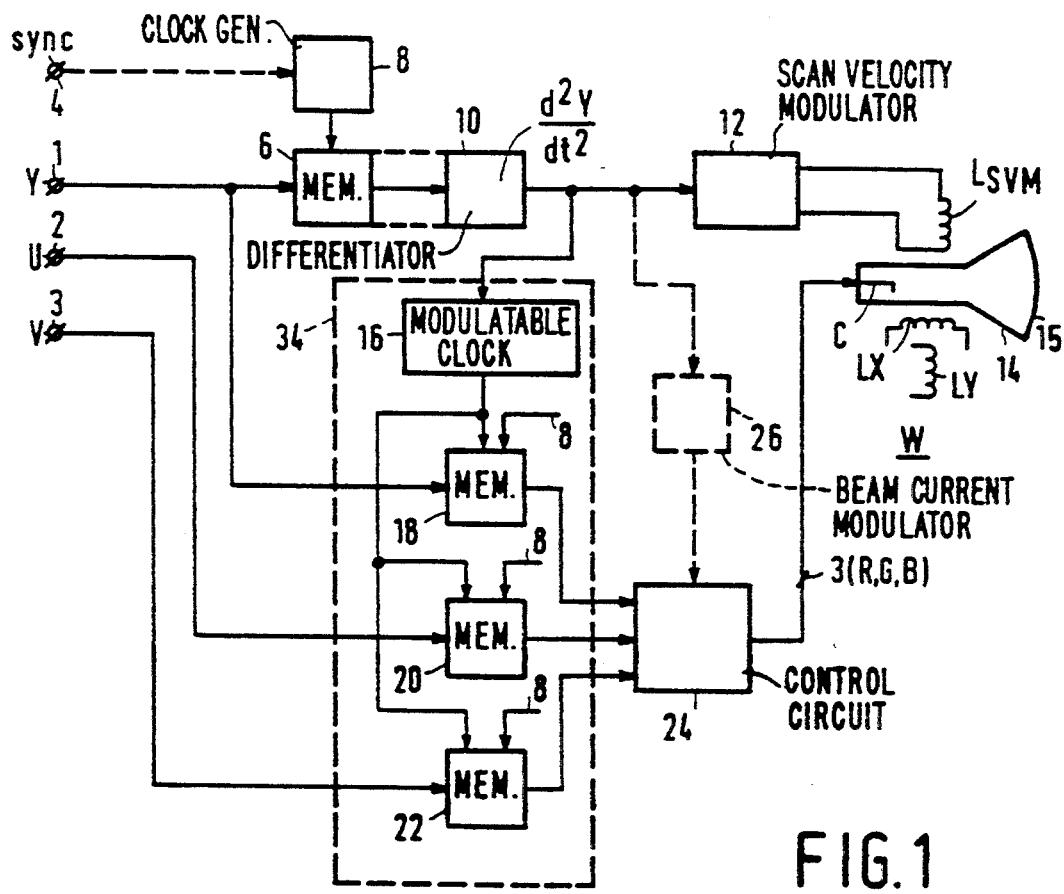
FIG. 1 shows a first embodiment of a display device according to the invention.

FIG. 1 shows an embodiment of a display device W having inputs 1, 2 and 3 which receive a luminance component Y and chrominance components U and V, respectively, of a video signal. An input 4 of the display device receives a synchronizing signal sync. The luminance component Y of the video signal is applied to a memory 6 in which the luminance component is stored under the control of a clock signal generated in a clock generator 8. The memory is also used for an adapted delay until the relevant signals are satisfactorily timed. The clock generator 8 will generally be controlled by the synchronizing signal sync. The second derivative of the luminance component stored in the memory 6 is determined by a differentiator 10. Instead of a differentiator, one or two delay elements (for example, combined with the memory) may alternatively be used for determining the second derivative. As is known, the second derivative of the luminance component Y is necessary for generating scan velocity modulation. This second derivative is applied to a scan velocity modulator 12 which controls (for example) a modulation coil Lsvm for generating the scan velocity modulation of electron beam currents deflected in a display tube 14 for displaying the video signal on a display screen 15. As is common practice, the display tube is further provided with a line deflection coil Lx and a field deflection coil Ly. These coils are controlled in known manner by line and field deflection circuits (not shown).

The second derivative is also applied to a modulatable clock 16. The clock 16 may be coupled to, for example the clock generator 8. The luminance component Y of the video signal is also applied to a second memory 18. The chrominance components (U, V) of the video signal are applied to a third memory 20 and a fourth memory 22, respectively. All the memories 18, 20 and 22 are controlled by the clock generator 8 for writing the components Y, U and V of the video signal into the memories (for example, under the control of the synchronizing signal) and for reading the components of the video signal from the memories under the control of the modulatable clock 16. The respective components of the video signals are therefore read in a modulated form from the respective memories. By modulating the modulatable clock 16 with the second derivative of the luminance component of the video signal, the clock signal undergoes the same variation as the electron beam in the display tube 14. The information rate can be modulated by modulating the clock. The video signal undergoes the same variation as the deflection of the electron beam current/currents in the display tube by reading the components Y, U and V of the video signal from the memories 18, 20 and 22 under the control of this modulated clock signal. Consequently, the deflection signals (which determine the position on the display screen) and the video signal are always synchronous so that, in principle, there will be no position error. The modulatable clock 16 and the memories 18, 20 and 22 form part of a position error correction circuit 34 which corrects the position error on the screen (at transitions between portions having a lower and a higher luminance), which error is caused by scan velocity modulation. Subsequently, the three components of the video signal are applied to a display tube control circuit 24. YUV signals are converted into RGB signals in the display tube control circuit, which RGB signals are applied to the (three respective) control electrode(s) (C), for example, three electron guns of the display tube 14. If desired, a transition in luminance may be further intensified in the display tube control circuit by rendering, for example, a less sharp transition even sharper (at a constant beam current the luminance is inversely proportional to the scan velocity).

Figure 2:
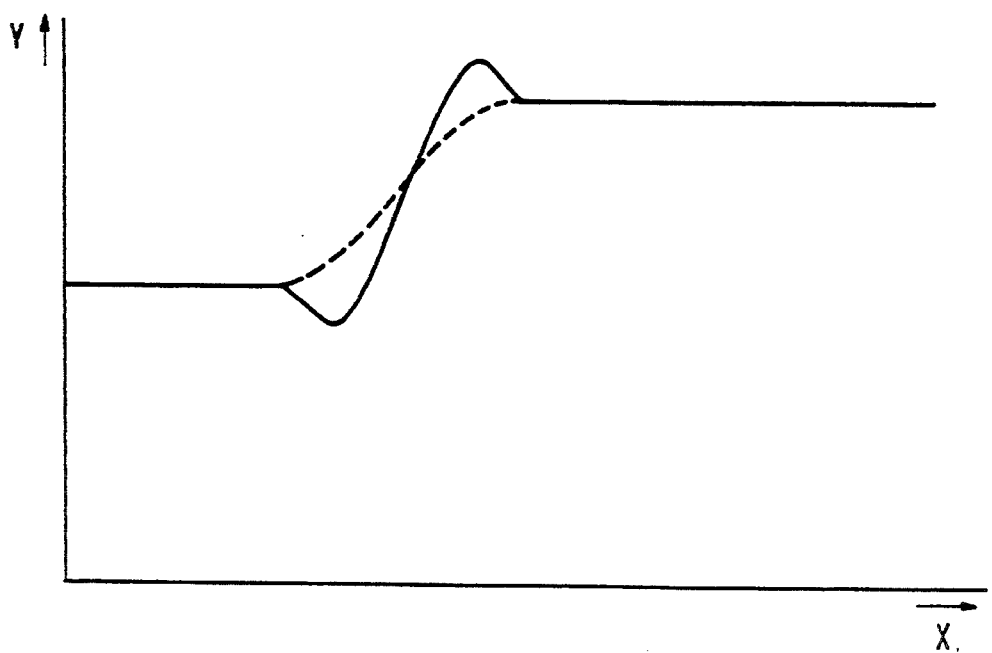
FIG. 2 shows an example of luminance variation of a video signal after scan velocity modulation.

As is known, a dark/light transition results in undershoots and overshoots in the displayed video signal when applying scan velocity modulation. This is understood to mean that at a dark/light transition, the luminance is decreased during a first part of the transition (lower than before the transition) and is increased during a last part of the transition (higher than after the transition). FIG. 2 shows this effect, with the position on the display screen being plotted on the horizontal axis and the luminance of the video signal being plotted on the vertical axis. FIG. 2 also shows, in broken lines, the luminance transition without scan velocity modulation. Due to this undershoot and overshoot, the impression of sharpness of the displayed video signal is intensified. However, a too large undershoot and/or overshoot is observed by the user as troublesome reflections and thereby detracts from the improved sharpness. The undershoots and overshoots are eliminated or at least reduced in luminance by using beam current modulation at a luminance transition of the video signal at which the beam current is increased during the first part of the transition and is decreased during the second part of the transition. This provides the possibility of using scan velocity modulation at a larger amplitude without producing effects which are troublesome to the user. This results in an even sharper display of the picture and also in a larger position error (which can, however, be simply corrected by means of clock modulation). An additional advantage of beam current modulation is that the beam current on the display screen is reduced during the second half of a rising edge (dark/light transition). This reduces the spot on the display screen so that the sharpness will further increase.

The embodiment of FIG. 1 shows a beam current modulator 26 in broken lines, which beam current modulator, similarly as the scan velocity modulator 12 and the modulatable clock 16, modulates the beam current under the control of the second derivative of the luminance component of the video signal. The beam current modulator applies a modulation signal to the display tube control circuit 24, which circuit corrects the R, G and B signals (or the Y component) with reference to this modulation signal and applies the corrected signals to the control electrodes C of the display tube 14. As described above, the amplitude of the scan velocity modulation can be increased without negative effects by using the beam current modulator. However, this results in a larger position error, but since the (read) clocks of the Y, U and V components of the video signal are modulated, this larger error is also corrected.

Figure 3:
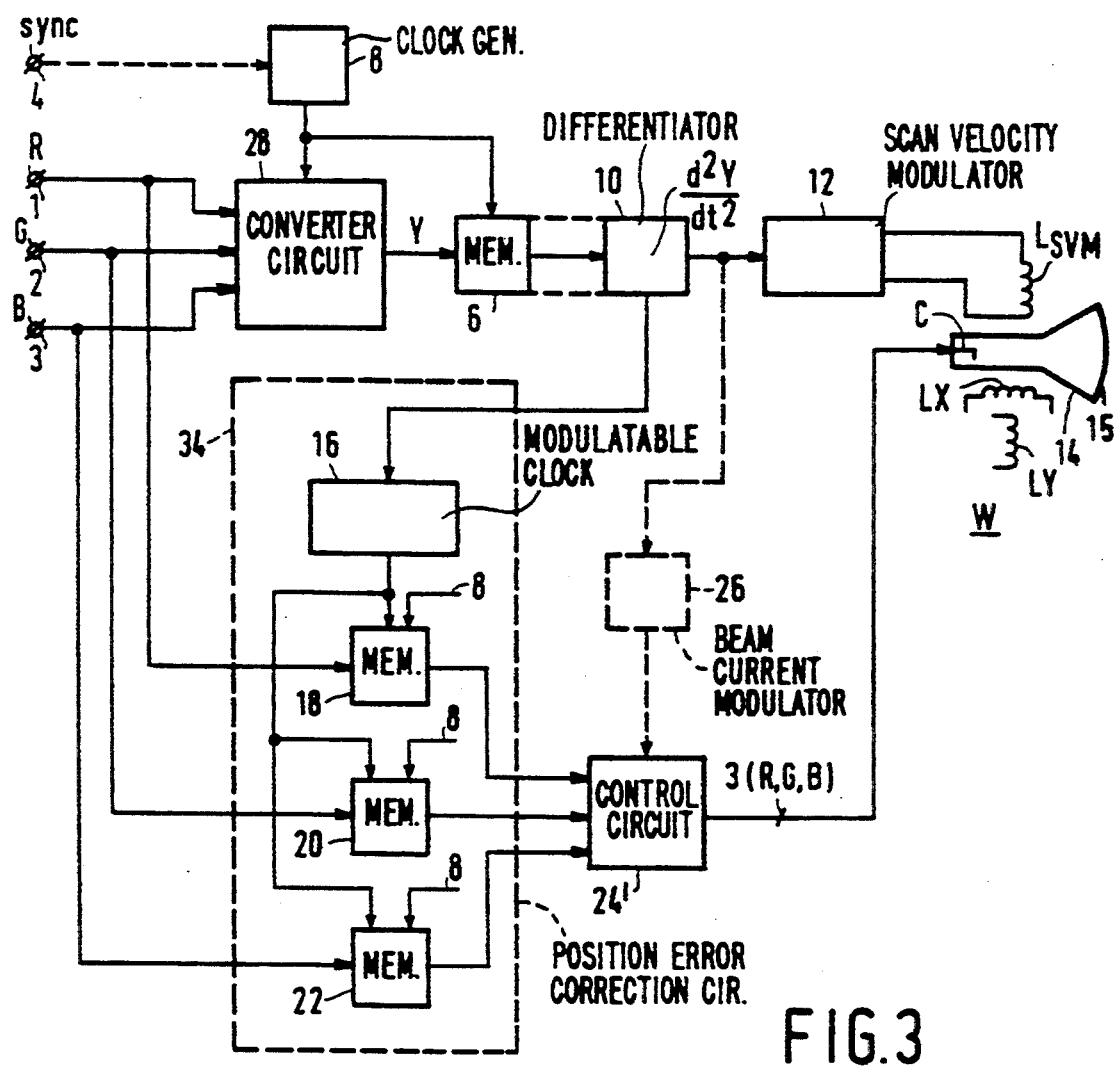
FIG. 3 shows a second embodiment of a display device according to the invention.

FIG. 3 shows a second embodiment of a display device. Elements denoted by the same reference numerals as in FIG. 1 have the same function. In this embodiment inputs 1, 2 and 3 of the display device receive R, G and B signals (from, for example a scart input). For the scan velocity modulation, it is necessary to determine the variation (derivative) of the luminance component of the video signal. In contrast to the embodiment shown in FIG. 1, the luminance component is now not directly available. To obtain the luminance component, the R, G and B signals are applied to a converter circuit 28 for determining the luminance component Y. The converter circuit is controlled by the clock generator 8. This luminance component is subsequently applied to the memory 6 whereafter the second derivative is determined in the differentiator 10. The R, G and B signals are also applied to the memories 18, 20 and 22, respectively (similarly as in FIG. 1). Now again these signals are written under the control of the clock generator 8 and read under the control of the modulatable clock 16 which, similarly as in FIG. 1, again receives a signal which is a measure of the second derivative. The display tube control circuit 24' need not perform the conversion YUV→RGB in this case, because the R, G and B signals are applied thereto. This display device W may also be provided with a beam current modulator 26 which applies a modulation signal for the beam current to the display tube control circuit.

Figure 4:
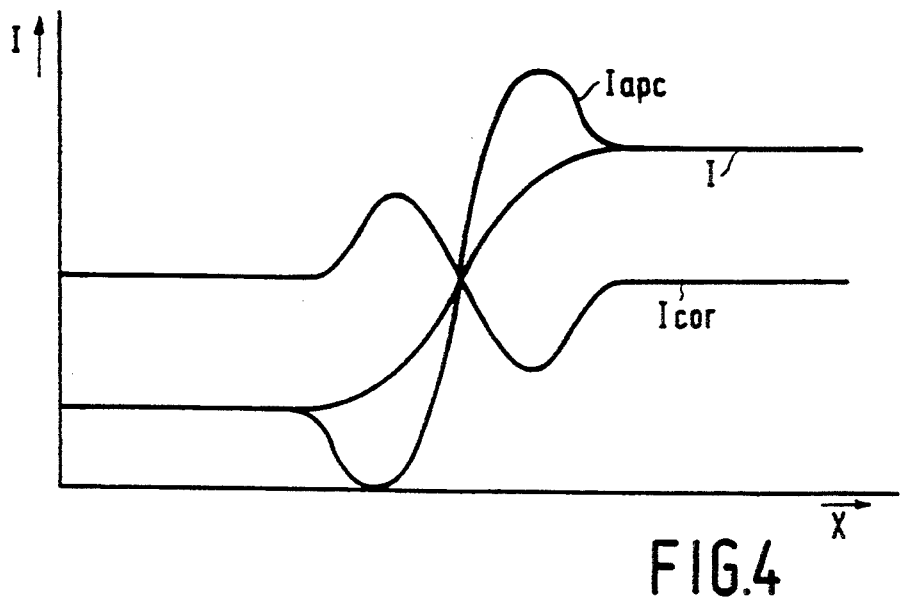
FIG. 4 shows an example of beam current variation in the case of aperture correction.

As described with reference to FIGS. 1, 2 and 3, the sharpness of a picture to be displayed can be improved by combining scan velocity modulation and clock modulation, and possibly beam current modulation. However, scan velocity modulation has a poor result at low mean beam currents and at small luminance transitions. Another way of improving the sharpness at small transitions in the luminance of the video signal of a picture to be displayed is the aperture correction (or spot size correction). At a large beam current the spot size is also (too) large. Edges (having a low intensity) of the aperture (spot) cannot be prevented from being incident on adjacent pixels. The blur which is then produced can be corrected in the video signal. If, due to the size of the spot, the number of phosphors luminescing on the display screen is larger than was intended, these adjacent phosphors are not excited by the correct beam current. This means that a given part of the information will land on adjacent phosphors. One manner of correcting this is to reduce the video signal for a given pixel by a suitably chosen fraction of the video signal which is associated with the adjacent pixels. These video signals can be obtained from the continuous video signal by means of delay lines. It is also possible to perform this operation on a digitized video signal. A correction signal Icor is derived from the original beam current I by means of, for example, a single or a double delay. This correction signal is then subtracted from the original beam current, which yields the aperture-corrected beam current Iapc. This is shown in FIG. 4 for a dark/light transition. As is apparent from this Figure, the beam current has an undershoot and an overshoot upon aperture correction. This is the reason why aperture correction does not yield any improvement at a high mean beam current and/or large transients, whereas a larger beam current (overshoot) produces such a spot growth that the improvement of the aperture (spot) is completely eliminated. However, there is an essential improvement at a low mean beam current.

Figure 5:
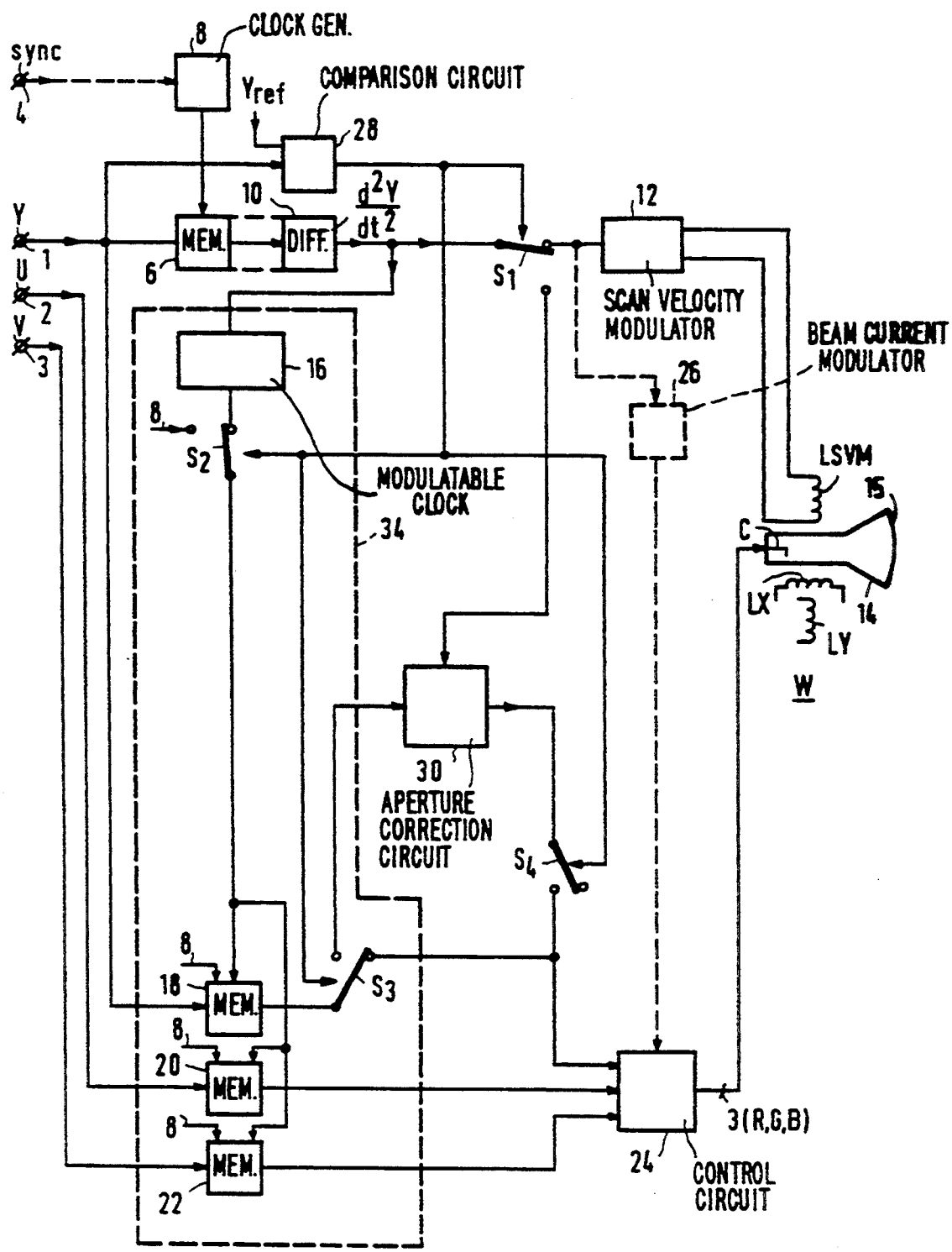
FIG. 5 shows an example of a display device according to the invention in which scan velocity modulation is combined with aperture correction.

FIG. 5 shows an embodiment of a display device W according to the invention in which scan velocity modulation is combined with aperture correction in such a way that the aperture correction prevails at a low mean beam current and the scan velocity modulation prevails at a high mean beam current. Elements having the same function as in FIG. 1 and/or 3 have the same reference numerals. The display device may also be provided with a beam current modulator 26. In this embodiment the luminance component Y of the video signal is not only applied to the memories 6 and 18 but also to a comparison circuit 28. In this comparison circuit, the luminance component Y is compared with a reference value Yref. If the luminance component Y is smaller than the reference value, the comparison circuit will supply a control signal under whose control switches S 1, S2, S3 and S4 are put from the position shown in FIG. 5 to the position not shown. In the shown position of the switches, the display device operates in conformity with the embodiment as shown in FIG. 1. In the position not shown the output of the differentiator 10 is coupled to an aperture correction circuit 30 via the switch S1. A second input of the aperture correction circuit receives, via the switch S3, the luminance component Y as stored in and read from the memory 18 (under the control of the clock generator 8, switch S2 in the position not shown). The aperture correction circuit computes a corrected luminance component, which corrected component is applied to the display tube control circuit 24 via the switch S4. The display tube control circuit 24 converts, inter alia, the incoming (corrected) luminance component Y and the chrominance components U and V into the R, G, B signals to be applied to the display tube 14. The aperture correction circuit 30 may subtract, for example, the second derivative of the luminance component from the luminance component so as to obtain a corrected luminance component. It is alternatively possible for the aperture correction circuit 30 to compute a corrected luminance component in a more complex manner. When the switches S1, S2, S3 and S4 are in the position shown in FIG. 5, the output of the differentiator 10 is connected to the input of the scan velocity modulator 12. In dependence upon the second derivative of the luminance component, this scan velocity modulator applies a control signal to the modulation coil Lsvm for generating the scan velocity modulation. The output of the differentiator 10 is also connected to the modulatable clock 16 which, as described with reference to FIGS. 1 and 3, supplies a modulated clock signal. This modulated clock signal is applied via the switch S2 to the memories 18, 20 and 22 for reading the components Y, U and V of the video signal in a modulated form. The output of the memory 18 is connected to one of the inputs of the display tube control circuit 24 via the switch S3. In this state, the aperture correction circuit 30 cannot apply an output signal to the display tube control circuit because the switch S4 is open. It will be evident that the corrections of the luminance component of the video signal by means of the aperture correction circuit 30 and the scan velocity modulator 12 may even better blend with each other, for example, by superimposing the two corrections. This can be realized, for example, by superimposing the two circuits with a weighting factor dependent on the video signal instead of by switching between the two circuits, so that the two areas will easily blend with each other.

The embodiments of a display device according to the invention are described with reference to color display tubes. It will be evident that the invention may also be used in a display device having a monochrome display screen or in (computer) monitors. In embodiments of digital television, the delay elements required for computing the derivatives can be easily realized by means of modulatable clock signals, etc.

We claim:

1. A display device for displaying a video signal on a display screen of a display tube comprising at least one control electrode and deflection coils for deflecting at least one electron beam current, said display device further having an input for receiving the video signal, means for determining a derivative of a luminance component of the video signal, a scan velocity modulator for modulating the deflection rate of the electron beam current in the display tube in dependence upon the determined derivative, a position error correction circuit for correcting the video signal in dependence upon the derivative of the luminance component of the video signal, and means for applying the corrected video signal to the control electrode of the display tube, characterized in that the position error correction circuit comprises a frequency-modulatable clock (16) which is coupled to the means for determining the derivative of the luminance component of the video signal, said frequency-modulatable clock thereby generating a read clock signal; and a memory into which said video signal is written, said memory having a read clock signal input to which said read clock signal is applied, whereby the video signal stored in said memory is read at a frequency-modulated clock rate in dependence on said derivative of the luminance component.

2. A display device as claimed in claim 1, characterized in that the means for determining the derivative of the luminance component of the video signal comprise a clock signal generator, a further memory and a differentiator, the luminance Component of the video signal being written into said further memory under the control of said clock signal generator, and the luminance component stored in said further memory being applied to the differentiator.

3. A display device as claimed in claim 2, characterized in that the output of the differentiator is coupled to the scan velocity modulator for supplying a modulation signal.

4. A display device as claimed in claim 2, characterized in that the memory includes a write clock signal input coupled to the output of said clock signal generator so that the video signal is written into said memory at a fixed write clock rate under control of the clock generator.

5. A display device as claimed in claim 1, characterized in that the means for applying the corrected video signal comprises a display tube control circuit for receiving the modulated video signal read from the memory and for applying the video signal suitable for display to the control electrode(s) of the display tube.

6. A display device as claimed in claim 1, characterized in that the display device further comprises a beam current modulator coupled to an output of said means for determining a derivative for modulating the electron beam current in dependence upon the determined derivative of the luminance component in the video signal.

7. A display device as claimed in claim 6, characterized in that the beam current modulator has an output coupled to the means for applying the corrected video signal to the control electrode of the display tube for adapting the video signal in the applying means in dependence upon the output signal of the beam current modulator.

8. A display device as claimed in claim 1, characterized in that the display device also comprises an aperture correction circuit for correcting the luminance component of the video signal in dependence upon the derivative of the luminance component, the display device comprising a comparator for comparing the luminance component with a reference value and for aperture-correcting said component in dependence upon the output signal of the comparator.

* * * * *